United States Patent
Jernigan et al.

(10) Patent No.: US 7,970,732 B2
(45) Date of Patent: Jun. 28, 2011

(54) DATA MIGRATION

(75) Inventors: Stephen Jernigan, South Riding, VA (US); Ronald Boals, Tulsa, OK (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 846 days.

(21) Appl. No.: 11/933,700

(22) Filed: Nov. 1, 2007

(65) Prior Publication Data

US 2009/0119476 A1      May 7, 2009

(51) Int. Cl.
*G06F 7/00* (2006.01)
*G06F 17/00* (2006.01)
(52) U.S. Cl. ......... 707/602; 707/694; 707/796; 707/805
(58) Field of Classification Search .......... 707/600–831; 709/223–225, 229; 713/166
See application file for complete search history.

(56) References Cited

U.S. PATENT DOCUMENTS

2002/0138570 A1 * 9/2002 Hickey .......................... 709/204
2007/0179983 A1 * 8/2007 Putman ......................... 707/200

OTHER PUBLICATIONS

Goldman, Data interfaces as support for module migration, Mar. 21-23, 1994, one page.*
Cimitile et al, Incremental migration strategies: data flow analysis for wrapping, Oct. 12, 1998-Oct. 14, 1998, 59-68.*

* cited by examiner

*Primary Examiner* — Jean B Fleurantin (57) ABSTRACT

Data is extracted from at least one data source. The data is translated according to a metadata model and is stored in a staging data store. A migration management user interface is provided that includes a mechanism for indicating at least some of the data to be included in a migration event. The migration event is initiated based at least in part on the input received via the user interface. The at least some of the data is migrated from the staging data store to a target data store according to a hierarchy of controls.

21 Claims, 4 Drawing Sheets

DATA MIGRATION

BACKGROUND INFORMATION

It is often desirable to migrate data from one data store to another. For example, it is often necessary to migrate data from a so-called legacy system to another system. However, such migrations can have many pitfalls. Data in a legacy system is generally in a format that is incompatible with a format required by the other system. Further, data in a legacy system may suffer from a lack of integrity, i.e., different fields of data in the legacy system may be inconsistent with one another, data in the legacy system may be missing or incorrect, etc. Moreover, data from one legacy system may not be compatible with data from a second legacy system, making it difficult to combine data from multiple legacy systems in a single target system.

Present data migrations are generally performed by extract, transform (or translate), and load ("ETL") processes. Unfortunately, present ETL processes are generally inadequate to remedy data integrity problems in the legacy system. Further, present ETL processes may not detect all issues potentially arising from incompatible formats between a data source and a data target in a data migration scenario.

DETAILED DESCRIPTION OF THE PREFERRED EMBODIMENTS

Figure 1:
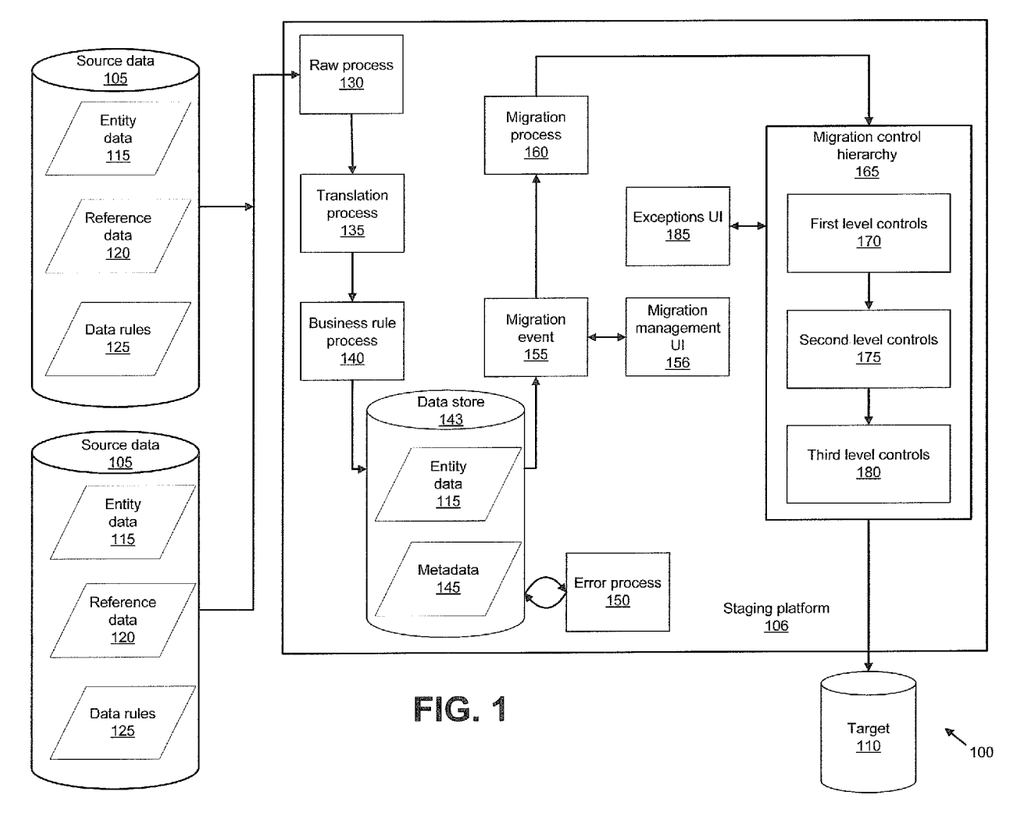
FIG. 1 illustrates an exemplary system for migrating data from a source system, via a staging platform, to a target system.

FIG. 1 illustrates an exemplary system 100 for migrating data from one or more source data systems 105, via a staging platform 106, to a target system 110.

A source data system 105 is often what is referred to as a "legacy" system. Source data system 105 may be any one of a number of different types of information technology system, such as a billing system, an inventory system, a financial system, a marketing system, etc. In any event, source data system 105 generally includes a variety of different kinds of data, including entity data 115, reference data 120, and data rules 125. Source system 105 data may be provided via a variety of mechanisms, e.g., a query to a database, FTP, retrieval of a file from a computer-readable medium, etc.

Once data is obtained from source system 105, it may be processed in staging platform 106 according to various processes, including a raw process 130, a translation process 135, and a business rule process 140. A staging data store 143 stages entity data 115 and also hosts processes that transform and validate entity data 115, and also stores metadata 145 that is used by one or more error processes 150 to verify the integrity and correctness of entity data 115 extracted from sources 105. A migration management user interface 156 is used to facilitate creation of a migration event 155 that, when subjected to a migration process 160, processes entity data 115 for population into target 110 according to controls 170, 175, 180 in a migration control hierarchy 165. As illustrated in FIG. 1, migration control hierarchy 165 includes first level controls 170, second-level controls 175, and third level controls 180. Migration process 160 detects exceptions, e.g., detected according to controls 170, 175, 180 in hierarchy 165, and provides an exceptions user interface 185, e.g., a graphical user interface (GUI), with which users may provide input and instructions with respect to detected exceptions.

Source system 105 may include a variety of hardware and/or software. For example, source system 105 may include one or more computer servers associated with a relational database management system (RDBMS) from which data 115, 120, 125 may be extracted. However, source system 105 may also represent other mechanisms for providing data 115, 120, 125, such as data stored in one or more files and obtained via file transfer protocol (FTP) or the like, data obtained from a computer-readable medium such as a disk or tape, or even manual entry of data, among other possible mechanisms.

Staging platform 106 may likewise include a variety of hardware and/or software, including one or more computer servers for executing processes 130, 135, 140, 150, 160, etc., for storing metadata 145, and for creating and storing migration events 155 for providing user interfaces 156 and 185, and for processing data according to migration controls hierarchy 165. One or more of the computer servers included in staging platform 106 may be associated with an RDBMS or the like for staging data extracted from one or more source data systems 105, and for storing metadata 145. The precise number and type of computer servers included in staging platform 106 is not crucial. Further, it is not crucial that any two components of staging platform 106, e.g., any two processes 130, 135, 140, 150, 160, etc., are stored and/or executed on a particular computer server. Thus, staging platform 106 may be configured according to a variety of architectures.

Entity data 115 includes business data or other data related to the subject matter encompassed by source data system 105. For example, if source data system 105 is a billing system, entity data 115 may include data concerning customers, goods and services ordered by customers, amounts owed and paid by customers, etc. Entity data 115 generally includes data of interest to users, and accordingly entity data 115, or metrics derived from entity data 115, may be intended for to display to users. Entity data 115 is included in source data system 105, from which it is extracted, transformed, staged, and migrated as described below.

Reference data 120 and data rules 125 are generally not of direct interest to users, but instead are used to support querying and display of entity data 115. Reference data 120 includes information related to entity data 115 such as complete words or phrases corresponding to abbreviations or codes that may be found in entity data 115. Data rules 125 include rules for processing specific data values in entity data 115. For example, data from sources 105 is frequently legacy data that may have been populated into a source 105, and may refer to products, services, business units, etc. that no longer exist or that are referred to in a manner different from a manner at the time the legacy data was populated. Accordingly, a data rule 125 may identify a field of such a legacy data and update it appropriately to include current references, e.g., to current products, services, business units, etc.

Raw process 130 extracts entity data 115, reference data 120, and data rules 125 from source data system 105. Raw process 130 then applies reference data 120 and data rules 125 to entity data 115. For example, with respect to reference data 120, raw process 130 locates codes or abbreviations in entity data 115 and substitutes such codes or abbreviations with appropriate reference data 120. Similarly, raw process 130 identifies fields in entity data 115 to which a data rule 125 should be applied, and applies the data rule 125, e.g., modifying a value in a field of entity data 115. Raw process 130 may perform other so-called "clean up operations," such as identifying fields in entity data 115 that incorrectly include blank or null values, identifying fields in entity data 115 that include incorrect data types, etc.

Translation process 135 translates entity data 115 to a format compatible with metadata 145. Sometimes translation process 135 is referred to as a process of normalizing entity data 115 to metadata 145 because metadata 145 includes a common model for data from various data source systems 105. Translation process 135 accommodates the fact that data models governing data extracted from various data source systems 105 may vary widely. Even two similar data source systems 105, e.g., two billing systems, may include different hierarchies describing customers, products, services, etc. Accordingly, metadata 145 provides a generic view of data to be populated into a target system 110. For example, if target system 110 is to include customer data, metadata 145 includes a standardized hierarchy for customer data. Translation process 135 then includes rules for mapping entity data 115 into a model or schema established by metadata 145. By applying such rules, entity data 115 is translated or normalized to metadata 145. Because each source data system 105 generally presents a unique data model, translation process 135 is generally customized to normalize each set of entity data 115 according to metadata 145. That is, at least some of the instructions or steps included in translation process 135 are created especially for a given data model associated with a particular data source system 105.

Business rule process 140 operates on entity data 115 after translation process 135 has been applied to it. Business rule process 140 includes business rules governing entity data 115 that may be applied once entity data 115 is normalized to metadata 145. For example, a business rule process 140 may detect missing data, missing keys, data outside of an acceptable range, etc.

After entity data 115 has been normalized and included in data store 143, one or more error processes 150 may be applied to entity data 115 according to metadata 145. Error processes 150 advantageously may be applied to entity data 115 combined in data store 143 from multiple data source systems 145. For example, metadata 145 may require that a field in entity data 115 from a first data source system 105 is populated with a particular value, and then a field in entity data 115 from a second data source 105 must be populated with that value or some other particular value. Accordingly, once entity data 115 from the first and second data source systems 105 have been subjected to translation process 135, error process 150 may determine whether a rule is met requiring a particular value in the field in entity data 115 from the second data source 105 based on the particular value in the field in entity data 115 from the first data source 105.

A specific example of an error process 150 from the telecommunications industry is as follows. A particular customer may receive various kinds of telecommunications services from a telecommunications provider, such as a first set of services related to voice communications and a second set of services related to data communications. Data concerning the customer's receipt of voice communications services may be included in a first set of entity data 115 from a first data source system 105. Data concerning the customer's receipt of data communications services may be included in a second set of entity data 115 from at least a second data source system 105. Both the first and second sets of entity data 115 may include fields for a customer's name, address, etc. Such corresponding fields may have different field names, different data types, etc., requiring normalization by translation process 135 according to metadata 145. Then, after such normalization, business rule process 140 may compare corresponding fields in the first and second sets of entity data 115. Upon finding a discrepancy, business rule process 140 may take a variety of different actions, such as populating the second set of entity data 115 with values from the first set of entity data 115 in case of any discrepancy, filling in blank values in one set of entity data 115 with values from corresponding fields in the other set of entity data 115, flagging discrepancies for later resolution by a user, etc.

Error processes 150 may be scripts, stored procedures, or the like that include instructions for identifying conditions in entity data 115 that violate the integrity of metadata 145. For example, a particular field or combination of fields in entity data 115 may be designated a primary key. An error process 150 may include instructions for detecting multiple records; if more than one such record exists, having a particular value in a field or combination of fields designated as a primary key. Similarly, an error process 150 may detect a primary key or primary key fields having blank or null values. A further example of an error process 150 is detecting fields in entity data 115 having data outside of an accepted range of values e.g., alpha data where only numeric data is permitted, numeric data outside an accepted range, etc. Errors or potential errors detected by error processes 150 are generally flagged for subsequent attention as described below.

Migration event 155 may be an object or data structure, e.g., created and stored in a memory or other medium on a server computer that hosts metadata 145 or some other associated server computer. A migration event 155 may be created at least in part according to input received from migration management user interface 156, e.g., a graphical user interface (GUI) or the like. A migration event 155 includes an identification of a particular set of entity data 115, along with any user-specified transformations or rules that are to be applied to the entity data 115. For example, a migration event 155 for entity data 115 related to customer billing could be defined according to entity data 115 associated with a particular source data system 105 and a particular range of numeric customer identifiers. Accordingly, user interface 156 may provide a mechanism such as a text entry field, a drop-down box, or the like through which a user may indicate a range of numeric customer identifiers to be the subject of the migration event 155. Further, user interface 156 may provide a mechanism for a user to input an indication of a source data system 105 associated with the entity data 115 to be migrated. Of course, a migration event 155 may be defined according to many other parameters in lieu of or in addition to the foregoing, such as a particular product or set of products, a particular service or set of services, a vendor or particular set of vendors, data associated with a particular geographic location, etc.

Once migration event 155 is created, migration process 160 is executed to extract selected entity data 115 specified by the migration event 155 from staging data store 143. Migration event 155 essentially provides parameters to migration process 160, whereby migration process 160 queries and obtains entity data 115 from data store 143. Migration process 160 then translates the entity data 115 for target 110 according to a hierarchy of controls 170, 175, 180 in migration controls hierarchy 165. Certain events cause exceptions that are displayed in exceptions user interface 185. In some cases, a user may provide input to address displayed exceptions through user interface 185.

Each of controls 170, 175, 180, etc. is generally one or more computer programs, stored procedures, scripts, processes, etc. for operating on a subset of entity data 115 that may be modeled by metadata 145 as described further below.

Accordingly, controls hierarchy 165 generally corresponds to a hierarchy in a model for metadata 145. For example, controls 170 may govern a migration, i.e., an entire set of entity data 115. Controls 175 might govern entity data 115 at a customer level, i.e., subsets of entity data 115. Further, controls 180 might govern entity data 115 at an order level, i.e., additional subsets of entity data 115. Moreover, as described further below, controls 170, 175, 180 etc may communicate instructions or the like to one another to propagate such instructions within hierarchy 165. For example, a control 175 may execute an instruction at a customer level, which instruction, e.g., to modify a customer address, is also applicable to an order level. Accordingly, control 175 may propagate the instruction to a control 180 at the order level. Examples of different level controls 170, 175, 180, etc. and data to which such controls 170, 175, 180, etc. may correspond are discussed in more detail below.

First level controls 170 are generally migration-level controls and generate events and/or exceptions relating to an entire migration event 155, i.e., that affect all of the entity data 115 specified in a migration event 155. For example, a migration event 155 may specify that a migration is to begin at a particular date and time. Accordingly, first level control 170 may act to ensure that the migration begins at the specified date and time, or may generate an exception if it does not. To take another example, a first level control 170 may monitor a migration for unexpected stops, e.g., because a source data system 105 was unavailable or crashed during the migration, etc. First level controls 170 may also propagate rules down to second level controls 175, third level controls 180, etc. as described further below.

Second level controls 175, third level controls 180, etc., beneath first level controls 170 in migration control hierarchy 165 are generally dependent on specific attributes and hierarchies within entity data 115. That is, first level controls 170 generally relate to issues global to a migration event 155. However, as alluded to above, other level controls 175, 180, etc., generally governed attributes within a migration event 155 that are specific to the entity data 115 being migrated. For example, where entity data 115 relates to a set of customer data, second level controls 175 may relate to data at a customer level, and third level controls 180 may relate to data at an order level, as mentioned above, or to a service or product level that is beneath the customer level in the data model for the entity data 115. Second level controls 175 and third level controls 180 may generate exceptions that are displayed in exceptions user interface 185. For example, entity data 115 may include data outside of an accepted range for particular fields of entity data 115, whereupon a user may be presented with options in user interface 185 to cancel the migration of such data, or to allow the migration to proceed even though the data is outside of a predetermined, accepted range.

Second level controls 175 detect entities, e.g., records in a table, in entity data 115 that are at a top of a data hierarchy in entity data 115. Second level controls 175 accordingly enforce a hierarchy in a metadata model 215, discussed further below with reference to FIG. 2, of entity data 115. For example, if entity data 115 relates to telecommunications services, second level controls 175 may operate to ensure that attributes of a service specified by model 215 are correctly populated, e.g., according to instructions received from a user through migration management interface 156.

Further, for example, entity data 115 may include customer data. A customer name may have changed, and therefore entity data 115 taken from source systems 105 may need to be updated. In such case, it would be necessary for the customer name to be changed in all relevant records of entity data 115. Accordingly, a second level control 175 may operate to identify all records in a hierarchy according to a model 215 in which the customer name needs to be changed or updated, and may then effect such change.

Third level controls 180 verify the integrity of individual records in entity data 115. Third level controls 180 may provide one or more rules specifying exceptions to be generated and displayed in exceptions user interface 185 when certain conditions are encountered in entity data 115. For example, the program instructions and a third level control 180 may look for certain strings of data in entity data 115, and modify or replace such strings of data with other strings of data. Further, certain fields in entity data 115 may require transformation that is preferably accomplished manually, e.g., according to input from a user through user interface 185. A manual transformation may be desirable in the case where it needs to be applied to a small number of fields in entity data 115, and therefore cannot be efficiently applied according to programming in third level controls 180. An example of such a case is where data in entity data 115 relates to a particular product or service, and there are a minimal number, e.g., ten or fewer, instances of records pertaining to that product or service. In this case, having a user specify a transformation for the field in exceptions user interface 185 is more efficient than programming a transformation into a third level control 180.

As discussed further above and below, controls 170, 175, and 180 within migration control hierarchy 165 may propagate instructions to one another concerning transformation and population of various fields within entity data 115 being migrated to target 110.

Figure 2:
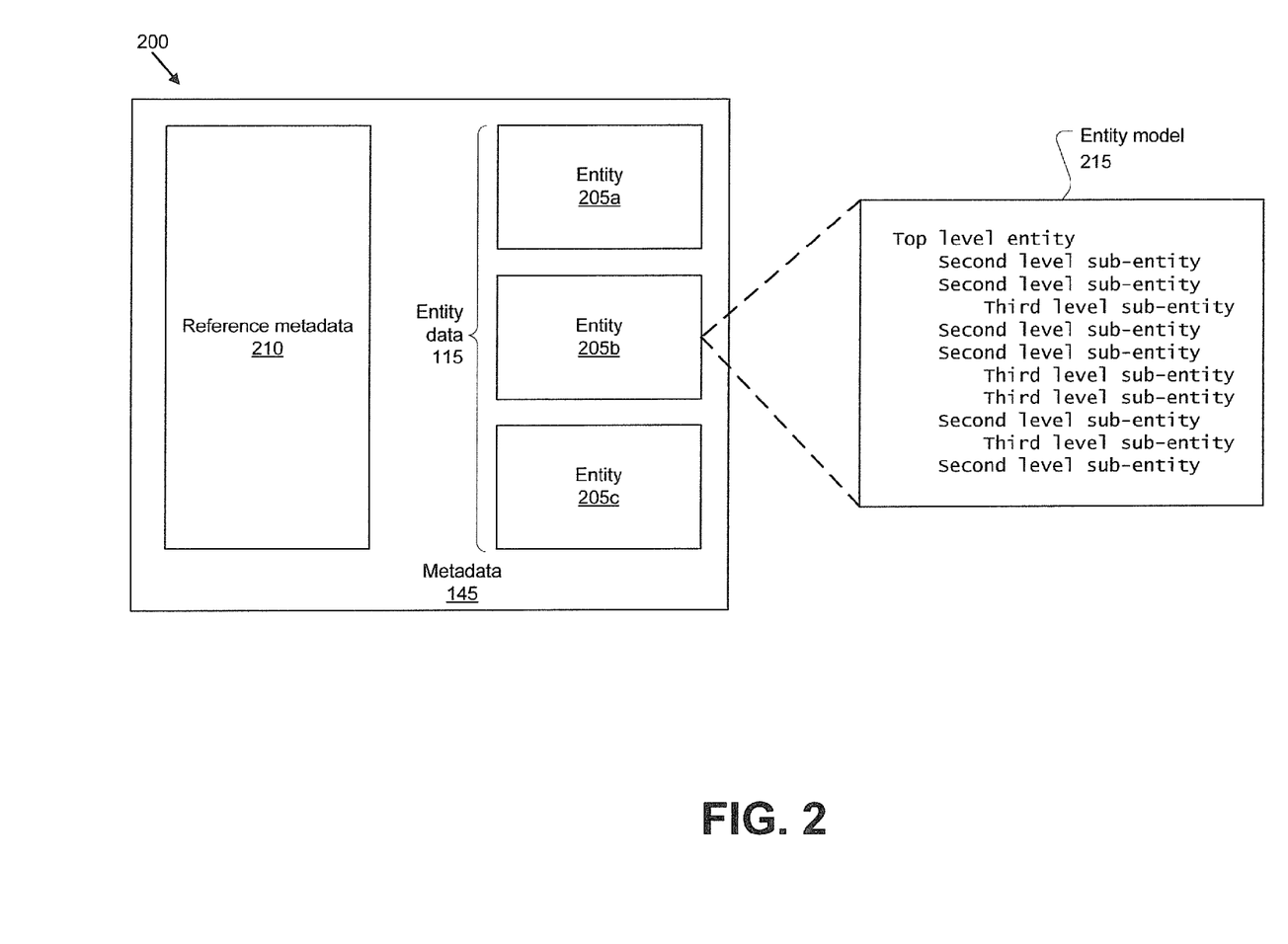
FIG. 2 illustrates an exemplary metadata model.

FIG. 2 illustrates an exemplary model 200 for metadata 145. As illustrated in FIG. 2, the model 200 includes entities 205 and reference metadata 210. Entities 205 are included in entity data 115. Three entities 205a, 205b, and 205c are illustrated in FIG. 2 by way of example, although fewer or more than three entities 205 could be included in entity data 115. Examples of entities 205 in one implementation include customers, services, and assets. For example, the customers may be telecommunications customers, the services may be telecommunications services, and the assets may be equipment or the like related to telecommunications customers and telecommunications services.

As further illustrated in FIG. 2, in entity 205b may be modeled according to an entity model 215. That is, an entity 205 may include a hierarchy of sub entities that may be represented in the entity model 215. For example, if entity 205b represents a telecommunications service entity, entity model 215 may include the sub entities in a hierarchy as represented below in Table 1.

TABLE 1

| Service |
|---|
|    Service Location |
|       State |
|    Billing Location |
|    Service Type |
|       Service Variety |
|          Features |
|       Bandwidth |
|          Features |
|       Access limitations |

Further, although not explicitly illustrated in FIG. 2, entity model 215 generally includes multiple entities 205, and generally specifies relationships between such entities 205. For example, entity model 215 may include hierarchies for customer entities 205, services entities 205, and assets entities 205, as well as information concerning the relationships, e.g., key relationships, whether the entities 205 have one to many or many to many relationships, etc., between the entities 205.

A benefit of metadata model 200 is that it includes information for modeling entity data 115 drawn from multiple source data systems 105. For example, information regarding a service entity 205 may be included in each of a first and a second source data system 105. While business rule processes 140, described above, may be executed with respect to entity data 115 from each of the first and second source data systems 105, a process 140 is executed with respect to entity data 115 from a single source system 105 before the entity data 115 has been combined in data store 143 with entity data 115 from other source systems 105. Therefore, business process 140 is restricted to analyzing entity data 115 from a source data system 105 without reference to any entity data 115 from any other source data system 105. However, once entity data from multiple source data systems 105 has been included in data store 143, and once metadata 145 has been created, error process 150, described above, may execute to detect errors, data integrity issues, etc. whose existence may be determined only once entity data 115 from multiple sources close 105 has been combined according to a common model 200.

For example, with reference to a service entity 205, a first data source system 105 may be responsible for identifying customers subscribing to the service, while a second data source system 105 is responsible for identifying attributes of the service. Only after entity data 115 from both first and second to data source systems 105 have been combined in data store 143 according to model 200 is it possible for an error process 150 to determine whether any customers subscribe to the service, and therefore whether attributes for the service should be included in target 110.

Figure 3:
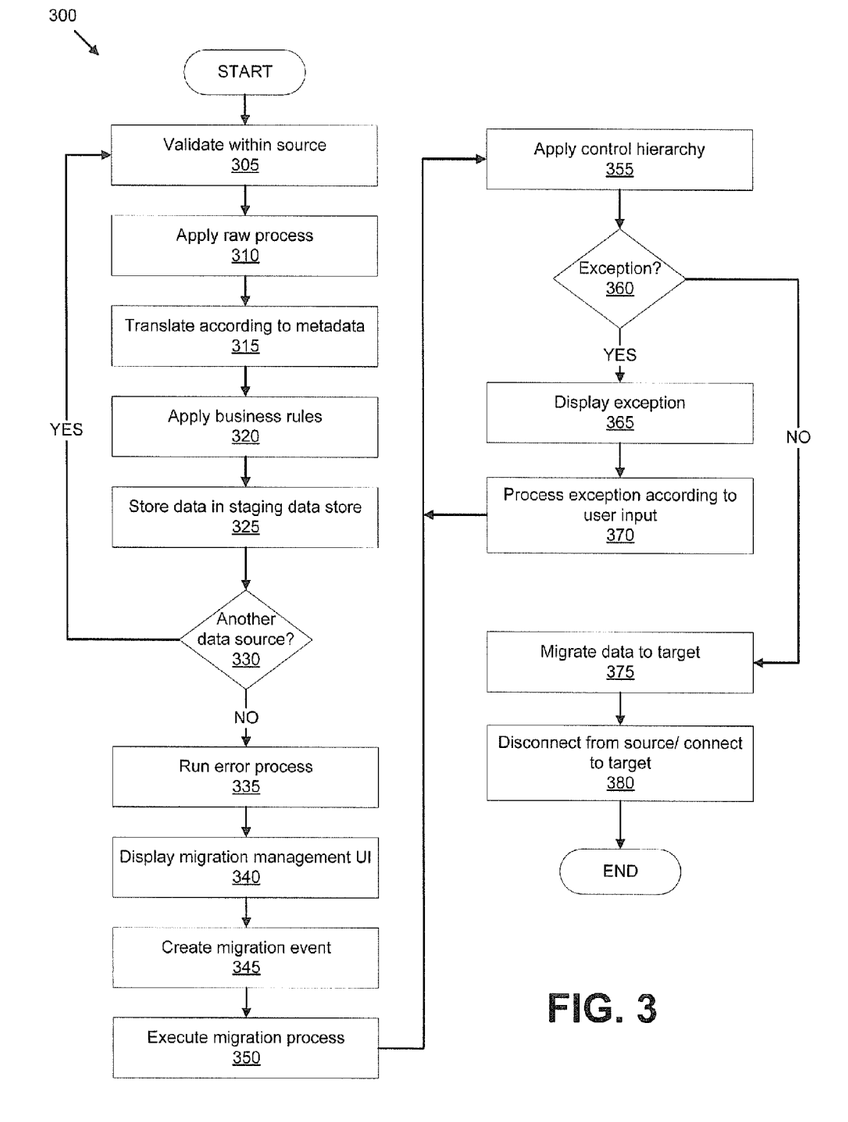
FIG. 3 illustrates an exemplary process for migrating entity data from a source data system to a target.

FIG. 3 illustrates an exemplary process 300 for migrating entity data 115 from a source data system 105 to a target 110.

Process 300 may begin in a step 305, where validation of entity data 115 may take place in a source data system 105. For example, it may be that with respect to particular lines of business and/or particular services, certain fields in entity data 115 must be populated in order for the data 115 to be useful or meaningful. In such event, a computer program, manual query, etc. may be configured to remove records in which certain fields are not populated, or are populated outside of a predetermined range.

Next, in step 310, one or more raw processes 130 are applied to the entity data 115 extracted as described above with respect to step 305. In a raw process 130, entity data 115, along with reference data 120 and data rules 125, is extracted from source data system 105. Such extraction may be performed in a variety of ways, e.g., according to a computer program written, e.g., in the Java programming language, possibly using extensible markup language (XML) in combination with such computer program, using one or more existing extract, transform, and load (ET and a) tools, creating a new or of a database, using file transfer protocol (FTP), etc. Further, it is possible that entity data 115 may be obtained by manual data entry, by manually uploading a file, by obtaining a file through e-mail, or by manually querying a database, etc.

Note that the entity data 115 obtained from the source data system 105 in step 305 may be a subset of entity data 115 available from the source system 105. For example, a source data system 105 may include entity data 115 pertaining to multiple lines of business, e.g., commercial and residential, and/or pertaining to multiple services offered to customers, e.g., various telecommunications services. However, it may be desired to obtain from a source data system 105 entity data 115 pertaining only to a single line of business, e.g. commercial, and/or pertaining only to a particular service or services, e.g., frame relay services. Accordingly, a computer program, manual query, etc. may be configured to obtain only desired entity data 115 from source data system 105.

A raw process 130 may further applied date of rules and perform cleanup operations as described above. For example, it may be desirable to append to certain fields of entity data 115 certain other data. Such data may be appended as part of a raw process 130. Appended data may include an identifier or the like relating to a source system 105 so that during and following a data migration the source system 105 from which a data record originated may be identified.

Next, in step 315, a translation process 135, as described above, translates entity data 115 according to metadata 145.

Next, in step 320, one or more business rule processes 140, as described above, are applied to entity data 115.

Next, in step 325, entity data 115 that has been subjected to rock process 130, translation process 135, and business rule process 140, as described above, is stored in staging data store 143.

Next, in step 330, it is determined whether entity data 115 is to be extracted from another data source system 105. Although process 300 may be applied with respect to a single data source system 105, generally the benefits of process 300 are most fully realized when applied to two or more data source systems 105. If entity data 115 is to be extracted from another data source system 105, process 300 returns to step 305. Otherwise, process 300 proceeds to step 335.

In step 335, one or more error processes 150, as described above, are applied to entity data 115 in staging data store 143.

Next, in step 340, migration management user interface 156 is displayed to the user. Although not illustrated in FIG. 1, system 100 may include one or more web servers or the like for providing interfaces 156, 185, etc. Alternatively, interfaces 156, 185, etc. may be provided from a computing device associated with data store 143 or some other computing device. In any event, system 100 generally includes instructions stored on a computer-readable medium for providing interfaces 156, 185 etc., and such instructions are generally executed by some computing device within system 100.

Migration management user interface 156 generally allows a user to select entity data 115 to be migrated from one or more data source systems 105 to a target system 110. For example, a user of interface 156 may select entity data 115 relating to a particular set of customers, a particular set of services, etc. Further, a user may be allowed to designate particular data source systems 105 from which data 115 should be extracted, or relevant entity data 115 may be extracted from all accessible data source systems 105 in which it may be found. Interface 156 generally also provides for other user inputs, such as an indication of a business representative requesting the migration, identities of relevant parties authorizing a migration, etc. A user may further specify parameters for a migration event 155, such as a start time and an end time for a migration process 160. Further, a user may specify rules for propagation of data and instructions and/or for overriding or modifying the migration of certain data within interface 156. Propagation and overrides within control hierarchy 165 are described further below.

Following step 345, a migration event 155 is created.

Next, in step 350, migration process 160 is executed.

Next, in step 355, as migration process 160 is executed, control hierarchy 165 is applied to the migration of entity data 115 from data store 143 to target 110.

Next, in step 360, it is determined whether processing of data 115 according to control hierarchy 165 has generated an exception. If not, process 300 proceeds to step 375. However, if an exception is generated, step 365 is executed next.

In step 365, exceptions user interface 185 displays the generated exception.

Next, in step 370, migration process 160 receives input via user interface 185, and processes entity data 115 accordingly. For example, as noted above, certain services or product configurations may have been insufficient number of records associated with them in entity data 115 to justify an automated migration process. Accordingly, it may be desirable to request user input through exceptions user interface 185 concerning rules for migration of such records. For example, interface 185 may display such data 115 to a user, and request either user approval or modification of the data 115 so that it may be migrated to target 110.

In step 375, data 115 is migrated to target 110. That is, data 115 is populated in a database or data store associated with target 110. Such migration may be performed according to a number of mechanisms, e.g., a structured query language query, FTP, use of XML in combination with a computer program, e.g., written in Java, etc.

Next, in step 380, entity data 115 in data source system 105 is generally deactivated, and entity data 115 populated in step 305 is generally activated in target 110. For example, if data source system 105 is responsible for managing billing associated with a set of customers or services, deactivating entity data 115 in the data source system 105 will include setting a flag or the like indicating that the relevant customer accounts or services are no longer active. However, it is further necessary to set flags or other mechanisms indicating that customer services associated with deactivated data 115 should not be stopped. Otherwise, migration of data 115 could interfere with provision of customer services. Such deactivation with respect to source data system 105 may be included in the program flow for a migration.

Similarly, flags may be set in target 110 to indicate that a new customer or set of services is activated. However, it may also be necessary to set flags or the like indicating that such new customer or services should not actually be provisioned. For example, when an order record is migrated to target 110, target 110 could include instructions for provisioning according to the order when the record is created in target 110. However, because the order is migrated from a source system 105, it is likely that provisioning was performed from the source system 105. Therefore, it is not desirable to provision the order again from the target 110.

Following step 380, process 300 ends.

Figure 4:
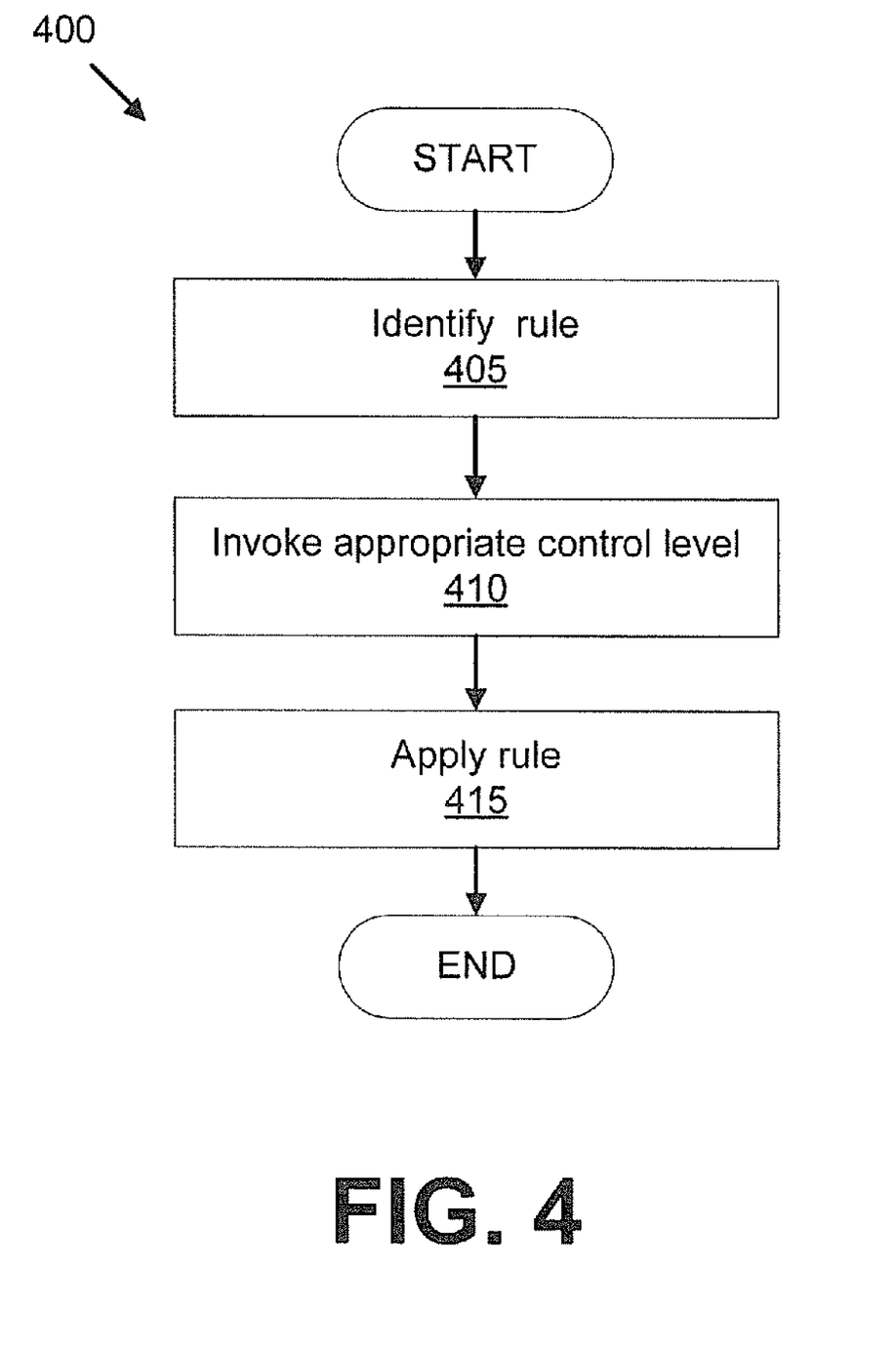
FIG. 4 illustrates an exemplary process for propagating instructions through a control hierarchy.

FIG. 4 illustrates a process 400 for propagating rules within a control hierarchy 165.

In step 405, a rule is triggered in a control 170, 175, or 180 in control hierarchy 165 during a migration and is identified as appropriate for propagation to one or more other controls 170, 175, or 180 in the control hierarchy 165.

Next, in step 410, the appropriate control or controls 170, 175, and/or 180 the rule triggered in step 405 are identified. For example, a migration level control 175 may trigger a rule to be propagated to a customer level control 175 and/or an order level control 180. One instance when such an example may occur would be when a customer's address needs to be changed throughout entity data 115 being migrated.

Next, in step 415, the rule triggered in step 405 is applied to entity data 115 by the appropriate level controls 170, 175, and/or 180, e.g., executed by the control or controls 170,175, 180. For example, as mentioned above, a customer addressed might be changed both in customer level records and order level records in entity day out 115.

Following step 415, process 400 ends.

The example given above with respect to process 400 assumed in a rule being propagated downward in control hierarchy 165, i.e., from a more general level control 172 a more specific level control or controls 175, 180, etc. However, propagation could occur in the opposite direction. For example, a rule might exist with respect to an order level control 180 that changes to customer level entity data 115 should be made when a certain number of a certain kind of orders are tallied in entity data 115. Accordingly, a rule could be triggered as described above with respect to step 405 in a low level control 180, and propagated up to a higher level control 175, e.g., to set a flag in customer entity data 115 because a certain number of orders have been tallied, e.g., the flag could be used to provide a discount based on a number of orders or for some similar promotional purpose.

CONCLUSION

In general, computing devices such as those referenced herein may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices, including, without limitation, a computer workstation, a desktop, notebook, laptop, or handheld computer, or some other computing device known to those skilled in the art.

Computing devices generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Computer-readable media include non-transitory computer-readable media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Data stores may be associated with various computing devices and may include a relational database management system (RDBMS). An RDBMS generally employs Structured Query Language (SQL) in addition to a language for creating, storing, editing, and executing stored procedures, such as the PL/SQL language mentioned above. However, it is to be understood that data stores associated with a computing device may be some other kind of database such as a hierarchical database, a set of files, an application database in a proprietary format, etc. A data store often includes a computing device employing a computer operating system such as one of those mentioned above, and are accessed via a network in any one or more of a variety of manners, as is well known.

Processes described herein, such as processes 130, 135, 140, 150, 155, 160, 300, etc. are generally tangibly embodied as one or more sets of computer-executable instructions stored on a computer readable medium. Such computer readable-medium may be included in or associated with one or more computing devices, although such devices are not illustrated in FIG. 1. Processes 130, 135, 140, 150, 155, 160, 300, etc. accordingly generally execute within one or more such computing devices. Similarly, metadata 145 is generally stored on a computer-readable medium, generally in association with a computing device such as a database server or the like. Target system 110 likewise generally includes one or more computing devices and/or databases.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, it is to be understood that the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites explicitly to the contrary.

What is claimed is:

1. A method, comprising:
    extracting data from at least one data source to a computer server;
    translating the data in the computer server according to a metadata model;
    storing the data in a staging data store;
    providing a migration management user interface to the computer server that includes a mechanism for indicating at least some of the data to be included in a migration event;
    initiating the migration event based at least in part on the input received in the computer server via the user interface; and
    migrating the at least some of the data from the staging data store to a target data store according to a hierarchy of controls, each of the controls including instructions executable by at least one processor in the computer server, the migrating including:
        triggering a rule in a first one of the controls;
        identifying a second one of the controls as appropriate for execution of the rule; and
        executing the rule in the second one of the controls.

2. The method of claim 1, wherein the hierarchy of controls includes a first level of the controls including migration level controls, a second level of the controls including customer level controls, and a third level of the controls including service level controls.

3. The method of claim 1, further comprising modifying, according to at least one of reference data and a data rule, at least one field in the data before translating the data.

4. The method of claim 1, further comprising applying at least one business rule to the data after translating the data but before storing the data in the staging data store.

5. The method of claim 1, further comprising:
    displaying at least one exception in an exceptions user interface while migrating the data;
    receiving user input in response to the exception; and
    migrating the at least some of the data according to the user input.

6. The method of claim 1, wherein the hierarchy of controls corresponds to a hierarchy in the model for the metadata.

7. A non-transitory computer-readable medium comprising instructions tangibly embodied thereon, the instructions being executable by a processor of a computer and comprising instructions for:
    extracting data from at least one data source;
    translating the data according to a metadata model;
    storing the data in a staging data store;
    providing a migration management user interface that includes a mechanism for indicating at least some of the data to be included in a migration event;
    initiating the migration event based at least in part on the input received via the user interface; and
    migrating the at least some of the data from the staging data store to a target data store according to a hierarchy of controls, the instructions for migrating including at least instructions for:
        triggering a rule in a first one of the controls;
        identifying a second one of the controls as appropriate for execution of the rule; and
        executing the rule in the second one of the controls.

8. The medium of claim 7, wherein the hierarchy of controls includes a first level of the controls including migration level controls, a second level of the controls including customer level controls, and a third level of the controls including service level controls.

9. The medium of claim 7, the instructions further comprising instructions for modifying, according to at least one of reference data and a data rule, at least one field in the data before translating the data.

10. The medium of claim 7, the instructions further comprising instructions for applying at least one business rule to the data after translating the data but before storing the data in the staging data store.

11. The medium of claim 7, the instructions further comprising instructions for:
displaying at least one exception in an exceptions user interface while migrating the data;
receiving user input in response to the exception; and
migrating the at least some of the data according to the user input.

12. The medium of claim 7, wherein the hierarchy of controls corresponds to a hierarchy in the model for the metadata.

13. A non-transitory computer-readable medium comprising instructions tangibly embodied thereon, the instructions being executable by a processor of a computer and comprising instructions for:
extracting data from at least one data source;
modifying, according to at least one of reference data and a data rule, at least one field in the data;
after the modifying, translating the data according to a metadata model;
after the translating, applying at least one business rule to the data and then storing at least some of the in a staging data store as a set of staged data;
providing a migration management user interface that includes a mechanism for indicating at least some of the staged data to be included in a migration event;
initiating the migration event based at least in part on the input received via the user interface; and
migrating the at least some of the staged data from the staging data store to a target data store according to a hierarchy of controls, the migrating including:
triggering a rule in a first one of the controls;
identifying a second one of the controls as appropriate for execution of the rule; and
executing the rule in the second one of the controls.

14. The medium of claim 13, wherein the hierarchy of controls corresponds to a hierarchy in the model for the metadata.

15. A system comprising:
a computer server having a processor and a memory, the computer server configured to: extract
data from at least one data source;
translate the data according to a metadata model;
store the data in a staging data store;
provide a migration management user interface that includes a mechanism for indicating at least some of the data to be included in a migration event;
initiate the migration event based at least in part on the input received via the user interface; and
migrate the at least some of the data from the staging data store to a target data store according to a hierarchy of controls, the computer server configured to migrate the data at least by:
triggering a rule in a first one of the controls;
identifying a second one of the controls as appropriate for execution of the rule; and
executing the rule in the second one of the controls.

16. The system of claim 15, wherein the hierarchy of controls includes a first level of the controls including migration level controls, a second level of the controls including customer level controls, and a third level of the controls including service level controls.

17. The system of claim 15, the computer server further configured to modify, according to at least one of reference data and a data rule, at least one field in the data before translating the data.

18. The system of claim 15, the computer server further configured to apply at least one business rule to the data after translating the data but before storing the data in the staging data store.

19. The system of claim 15, the computer server further configured to:
display at least one exception in an exceptions user interface while migrating the data;
receive user input in response to the exception; and
migrate the at least some of the data according to the user input.

20. The system of claim 15, wherein the hierarchy of controls corresponds to a hierarchy in the model for the metadata.

21. A system, comprising:
a computer server having a processor and a memory, the computer server configured to:
extract data from at least one data source;
modify, according to at least one of reference data and a data rule, at least one field in the data;
after the modifying, translate the data according to a metadata model;
after the translating, apply at least one business rule to the data and then store at least some of the data in a staging data store as a set of staged data;
provide a migration management user interface that includes a mechanism for indicating at least some of the staged data to be included in a migration event;
initiate the migration event based at least in part on the input received via the user interface; and
migrate the at least some of the staged data from the staging data store to a target data store according to a hierarchy of controls, the migrating including:
triggering a rule in a first one of the controls;
identifying a second one of the controls as appropriate for execution of the rule; and
executing the rule in the second one of the controls.

* * * * *